United States Patent [19]
Cadiou

[11] 3,947,680
[45] Mar. 30, 1976

[54] STEERING RESPONSIVE CONTROL DEVICE FOR TURNING AUTOMOTIVE HEADLAMPS

[75] Inventor: Jean Cadiou, Paris, France

[73] Assignee: Societe Anonyme Automobiles Citroen, Paris, France

[22] Filed: July 30, 1974

[21] Appl. No.: 493,735

[30] Foreign Application Priority Data
Aug. 6, 1973  France .............................. 73.28676

[52] U.S. Cl. .............................. 240/62.3; 240/62.5
[51] Int. Cl.² ................................. B60Q 1/12
[58] Field of Search....... 240/8.25, 61.1, 62 R, 62.3, 240/62.5, 7.1 LJ; 60/582, 584

[56] References Cited
UNITED STATES PATENTS

| 3,415,983 | 12/1968 | McGee | 240/62.3 X |
| 3,453,424 | 7/1969 | Cibie | 240/7.1 LJ |
| 3,614,416 | 10/1971 | Fleury | 240/7.1 LJ |
| 3,828,179 | 8/1974 | Straub | 240/62.3 X |

FOREIGN PATENTS OR APPLICATIONS

| 980,517 | 12/1950 | France | 240/62.5 |
| 1,224,712 | 3/1971 | United Kingdom | 240/62.3 |

Primary Examiner—L. T. Hix
Assistant Examiner—Alan Mathews
Attorney, Agent, or Firm—Wenderoth, Lind & Ponack

[57] ABSTRACT

A device for controlling the angular position of turning headlamps of motor vehicles comprises a correcting hydraulic circuit connecting an auxiliary distributor to the hydraulic circuit transmitting control power. The distributor is adapted to alternately be connected to a source of hydraulic liquid under pressure and to an exhaust for discharging liquid. The distributor permits a compensation for any reduction in the initial volume of the liquid in the control transmission circuit or a discharge of any excess liquid, such reduction or excess being due to variations in the thermal condition of the liquid in the circuit. Means are also provided for neutralizing the correcting circuit in all angular positions of the steering mechanism other than the straight-ahead driving position.

5 Claims, 1 Drawing Figure

U.S. Patent   March 30, 1976   3,947,680
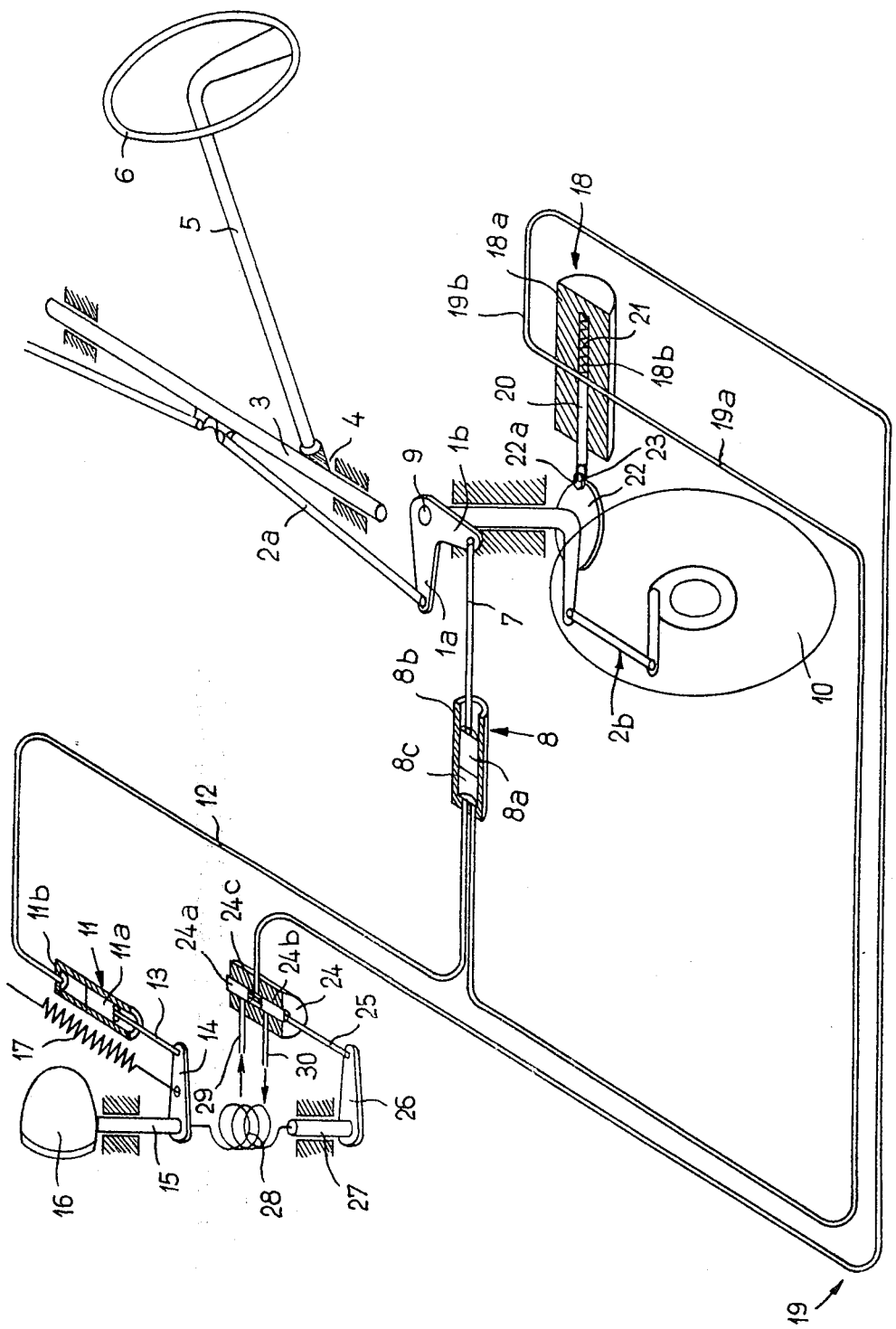

STEERING RESPONSIVE CONTROL DEVICE FOR TURNING AUTOMOTIVE HEADLAMPS

BACKGROUND OF THE INVENTION

The present invention relates to servo means for controlling the orientation of automobile headlamps as a function of the steering mechanism position, notably in the case of headlamps adapted to pivot on either side of a middle position.

It is known, with a view to obtain a better front visibility along sinuous or winding road sections, to control the direction of the light beams of turning front headlamps of a motor vehicle in response to the actuation of the steering mechanism or to the position of the steerable wheels, the headlamps pivoting laterally in relation to the direction of the path followed by the vehicle.

Hitherto known control devices of this type are based on the use of more or less complicated linkage systems, of flexible cables or rods driven through mechanical, electromagnetic or hydraulic means providing not only the lateral scanning function but also necessary ancillary correcting functions, notably the function of returning the device to the "straightahead" position requiring a considerable precision and reliability in time. These requirements, notably in the case of hydraulic systems, are frequently impaired by expansion effects due to thermal variations causing the volume of the operating fluid to increase or decrease. These variations are in turn a cause of undesired additional or insufficient movements leading to a certain detrimental misadjustment of the desired angular position of the headlamps. Obviously, although these disturbances are scarcely discernible or objectionable during angular scanning manoeuvers, they are detrimental and sometimes hazardous on account of their permanent nature when the vehicle is driven on straight roads.

Various devices have already been proposed for preventing these disturbances, notably by associating with the main headlamp hydraulic control circuit an auxiliary circuit wherein any volume variations are utilized for compensating variations due to the temperature prevailing in the main circuit, such auxiliary circuit being controlled by the expansion of an element heated by an electric circuit energized through means responsive to the movements of the headlamp proper. This system is objectionable because on the one hand it introduces a heating member acting with a certain lag or response time, and on the other hand it adds to the hydraulic system an electric circuit and a switch for supplying current to the heating element, with a consequent likelihood of impairing the reliability of the control system.

SUMMARY OF THE INVENTION

This invention provides a device for controlling the orientation of headlamps, such device being adapted to palliate the abovementioned disturbing effects while avoiding the inconveniences mentioned in the foregoing by utilizing only hydraulic members not relying on the use of a power source other than that already utilized in hitherto known control systems, this device being capable of restoring automatically the headlamps to their "straight ahead" position.

This control device is characterised essentially in that it comprises a hydraulic correcting circuit connecting an auxiliary distributor to the main or primary hydraulic circuit transmitting the control action to the turning headlamps. The distributor is adapted on the one hand to be connected in succession to a source of liquid under pressure and to an exhaust for draining liquid, and on the other hand to either compensate the reduction in the initial volume of liquid available in the main control transmission circuit or discharge an excess of such volume. Such reduction or excess results from a thermal condition of the liquid in the circuit. Means are also provided for neutralising the correcting circuit in the steering mechanism positions departing from that corresponding to a rectilinear driving path.

BRIEF DESCRIPTION OF THE DRAWING

Other features characterising this invention will appear as the following description proceeds with reference to the attached drawing illustrating diagrammatically by way of example a typical embodiment thereof shown in the "straight ahead" steering and headlamp position.

DETAILED DESCRIPTION OF THE INVENTION

Referring to the single FIGURE of the drawing it will be seen that the device according to the present invention comprises primarily a control unit including a two-armed bellcrank lever 1 of which one arm 1a is pivotally connected to the steering linkage member 2a driven by the steering rack 3 driven in turn (through reduction gears 4 and a steering column 5) by the steering wheel 6 of the vehicle. The other arm 1b of lever 1 is pivotally connected to the outer end of the rod 7 of a piston 8a slidably mounted in a cylinder 8b of a hydraulic transmitter 8. The pivot shaft or fulcrum 9 of lever 1 is rigidly connected to another member 2b of the steering linkage, which is operatively connected in turn to the stub-axle of a steerable wheel 10. The control unit further comprises a hydraulic receiver 11 having a cylinder 11b in which a piston 11a is slidably mounted, and a pipe line 12 connecting this cylinder 11b to a compression chamber 8c of transmitter 8. A rod 13 connects the piston 11a on the side opposite the outlet port of pipe line 12 (which is the inlet port of cylinder 11b) to an actuating lever 14 rigid with the pivot shaft 15 of a movable headlamp 16 of the motor vehicle, for example a turning headlamp adapted to pivot about the vertical axis of a supporting shaft 15, on either side of the middle position illustrated in the drawing. A return spring 17 constantly urges the lever 14 to counteract any movement thereof likely to be caused by the presence of fluid under pressure in receiver 11.

The device comprises on the other hand, according to the present invention, a correcting unit incorporating a stop valve 18 having formed in its body 18a a central bore 18b having a passage extending thereacross connecting two opposite sections 19a and 19b of an auxiliary correcting circuit 19. A valve member 20 slidably mounted in bore 18b of valve 18 against the force of an antagonistic spring 21 is adapted either to cut off the communication between the two circuit sections 19a and 19b of correcting circuit 19, or to permit the operation of circuit 19 by restoring such communication. To this end, the valve member 20 is operatively connected to a cam member 22 having a bottom dead centre adjacent the valve 18, cam member 22 being rigid with the shaft 9 of the steering mechanism. A roller follower 23 is carried by the sliding valve member 20 and permits the mutual engagement between valve member 20 and the aforesaid cam member 22, the spring 21 urging the valve member 20 to its open-circuit position when the roller follower 23 engages a cavity 22a formed at the bottom dead centre of cam 22 for restoring fluid circulation through the valve 18. The angular setting or timing of cam 22 is such that the bottom dead centre corresponding to the free communication in circuit 19 is operative only when the vehicle is being driven in the straight ahead condition. The first section 19a of correcting circuit 19 is connected to the compression chamber 8c of hydraulic transmitter 8, and the second section 19b opens into an auxiliary distributor 24.

This distributor 24 comprises a double-acting piston 24a slidably mounted in an axial bore of a cylinder 24b, and the central portion of piston 24a has a reduced diameter providing a central annular cavity 24c. Opening into cavity 24c located centrally of the cylinder for a piston position corresponding to the straight-ahead driving condition of the vehicle is a port connected to section 19b of the correcting circuit. This piston 24a is operatively connected via a rod 25 to the free end of a driven arm 26 connected in turn through a resilient torsion member 28 to the pivot shaft 15 of headlamp 16, such resilient torsion member providing a reduction ratio between the angular movement of the headlamp supporting shaft 15 and the shaft 27 connected to the distributor 24.

A feed line 29 from a suitable source of fluid under pressure (not shown) and an exhaust line 30 connected to a fluid reservoir open through corresponding ports into the cylinder 24b, on opposite sides of the central portion corresponding to the aforesaid cavity 24c of the piston in the position shown in the drawing.

This device, as far as the conditions of operation arising when driving the vehicle along a straight or substantially straight road are concerned, operates as follows:

The correcting circuit 19 becomes operative as a consequence of the backward movement of valve member 20 of stop valve 18 which is caused by the force of spring 21, as permitted by the engagement of a roller follower 23 in the bottom dead centre cavity 22a of cam member 22. Any residual variation in the volume of hydraulic fluid in pipe lines 12 and 19 (interconnected through the compression chamber 8c of control transmitter 8), due notably to temperature changes in relation to a preadjusted mean value, causes the piston 11a of control receiver 11 to move in one or the other direction. Thus, the actuating lever 14 operatively connected via rod 13 to piston 11a is shifted angularly, and consequently the headlamp 16 is also shifted angularly. This angular shift, transmitted from the actuating lever 14 to the driven lever 26 through resilient element 28, is attended by a movement of translation of the double-acting piston 24a in cylinder 24b of distributor 24 in one or the other direction, from the inoperative position shown in the drawing. Thus, the annular cavity 24c of piston 24a will register either with the feed line 29 (in case of contraction of the hydraulic liquid) or with the exhaust line 30 (in case of expansion of the hydraulic liquid), thus permitting restoration of the volumetric balance by increasing or reducing the volume of liquid in the circuit lines 12 and 19. This balance will cause the headlamp 16 to resume its straight-ahead drive position, due to the action of return spring 17.

For any angular position of the steering mechanism which departs from the rectilinear position, the valve member 20 of stop valve 18 is driven in by cam member 22 and thus the communication between the pipe line sections 19a and 19b is cut off by this valve, whereby the correcting device is neutralized.

Although a specific embodiment of this invention has been described hereinabove and illustrated in the accompanying drawing, it will readily occur to those skilled in the art that various modifications and changes may be made thereto without departing from the scope of the invention as set forth in the appended claims.

What is claimed as new is:

1. In a device for controlling the orientation of vehicle headlamps in response to movement of the vehicle steering mechanism, such device being of the type including a primary hydraulic circuit having liquid therein; a hydraulic transmitter mechanically connected to said steering mechanism and hydraulically communicating with said primary hydraulic circuit to pressurize said liquid therein in response to movement of said steering mechanism; a hydraulic receiver mechanically connected to said headlamps and hydraulically communicating with said primary hydraulic circuit to move said headlamps in response to pressurizing of said liquid; and means for compensating for volume changes of said liquid due to temperature variations thereof; the improvement wherein said compensating means comprises:

an auxiliary distributor mechanically connected to said headlamps and having an element movable in response to movement of said headlamps;

a correcting hydraulic circuit hydraulically communicating said auxiliary distributor with said primary hydraulic circuit;

hydraulic liquid supply means for supplying additional liquid to said correcting hydraulic circuit upon movement of said element of said auxiliary distributor in a first direction;

hydraulic liquid exhaust means for exhausting liquid from said correcting hydraulic circuit upon movement of said element of said auxiliary distributor in a second direction; and means, responsive to movement of said steering mechanism, for allowing communication between said correcting hydraulic circuit and said primary hydraulic circuit when said steering mechanism is in a straight-ahead driving position, such that liquid will be supplied to and exhausted from said primary hydraulic circuit in response to movement of said element of said auxiliary distributor, and for interrupting communication between said correcting hydraulic circuit and said primary hydraulic circuit when said steering mechanism is in any position other than said straight-ahead driving position;

whereby movement of said element of said auxiliary distributor will supply additional liquid to or exhaust excess liquid from said primary hudraulic circuit only when said steering mechanism is in said straight-ahead driving position and only as a result of volume change due to temperature variation of said liquid in said primary hydraulic circuit.

2. The improvement claimed in claim 1, wherein said element of said auxiliary distributor comprises a doubleacting piston mechanically connected to said headlamp and having a central portion of a reduced diameter to provide an annular cavity communicable, upon movement of said piston, with said liquid supply means or said liquid exhaust means.

3. The improvement claimed in claim 2, wherein said piston of said auxiliary distributor is connected by means of a pivoting member and a resilient torsion element to said headlamp.

4. The improvement claimed in claim 1, wherein communication allowing and interrupting means comprises a stop valve interposed in said correcting hudraulic circuit, a first portion of said correcting hydraulic circuit connecting said stop valve to said primary hydraulic circuit, and a second portion of said correcting hydraulic circuit connecting said stop valve to said auxiliary distributor.

5. The improvement claimed in claim 4, further comprising a cam member having a bottom dead center cavity and being rigidly connected to said steering mechanism, and wherein said stop valve includes a valve member carrying a cam follower, said valve member being biased such that said cam follower engages said cam member and rests on said bottom dead center when said steering mechanism is in said straight-ahead driving position, said valve member thus being moved to allow communication through said stop valve between said first and second portions of said correcting hydraulic circuit, and at any angular position of said steering mechanism other than said straight-ahead driving position said valve member of said stop valve is moved by said cam member to interrupt said communication.

* * * * *